United States Patent
Hu et al.

(10) Patent No.: US 11,630,280 B2
(45) Date of Patent: Apr. 18, 2023

(54) OPTICAL ELEMENT DRIVING MECHANISM

(71) Applicant: TDK TAIWAN CORP., Taoyuan (TW)

(72) Inventors: Chao-Chang Hu, Taoyuan (TW);
Chen-Hsien Fan, Taoyuan (TW);
Chih-Wen Chiang, Taoyuan (TW);
Chia-Che Wu, Taoyuan (TW);
Yu-Chiao Lo, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 221 days.

(21) Appl. No.: 16/950,238

(22) Filed: Nov. 17, 2020

(65) Prior Publication Data

US 2021/0396946 A1    Dec. 23, 2021

Related U.S. Application Data

(60) Provisional application No. 63/065,865, filed on Aug. 14, 2020, provisional application No. 63/041,459, filed on Jun. 19, 2020.

(30) Foreign Application Priority Data

Oct. 9, 2020 (CN) .......................... 202022232925.2

(51) Int. Cl.
*G02B 7/02* (2021.01)
*G02B 13/00* (2006.01)

(52) U.S. Cl.
CPC ........... *G02B 7/02* (2013.01); *G02B 13/0065* (2013.01)

(58) Field of Classification Search
CPC ........ G02B 7/02; G02B 7/00; G02B 13/0065; G02B 13/0055; G02B 13/00

USPC ........................................................ 359/822
See application file for complete search history.

(56) References Cited

U.S. PATENT DOCUMENTS

| | | | |
|---|---|---|---|
| 9,197,121 B2* | 11/2015 | Lee | H02K 41/035 |
| 9,766,532 B2* | 9/2017 | Park | G02B 13/009 |
| 2012/0008220 A1* | 1/2012 | Lee | H02K 5/04 |
| | | | 359/822 |
| 2013/0120861 A1* | 5/2013 | Park | H02K 41/0354 |
| | | | 359/824 |
| 2014/0355145 A1* | 12/2014 | Park | H02K 41/0354 |
| | | | 359/824 |
| 2015/0355524 A1* | 12/2015 | Park | G03B 13/34 |
| | | | 359/824 |

(Continued)

FOREIGN PATENT DOCUMENTS

CN        211698369 U       10/2020

OTHER PUBLICATIONS

Office Action dated Mar. 30, 2021 in CN Application No. 202022232925.2, 2 pages.

*Primary Examiner* — William R Alexander
(74) *Attorney, Agent, or Firm* — Muncy, Geissler, Olds & Lowe, P.C.

(57) ABSTRACT

An optical element driving mechanism is provided, including a fixed part, a movable part, a driving assembly and a supporting assembly. The movable part is movable relative to the fixed part, and is connected to an optical element. The driving assembly drives the movable part to move relative to the fixed part. The movable part is movable relative to the fixed part in a moving range via the supporting assembly.

20 Claims, 15 Drawing Sheets

(56) References Cited

U.S. PATENT DOCUMENTS

| | | | |
|---|---|---|---|
| 2016/0011394 A1* | 1/2016 | Cho | G02B 7/09 |
| | | | 359/822 |
| 2016/0043622 A1* | 2/2016 | Lee | H04N 5/2254 |
| | | | 310/12.16 |
| 2017/0343886 A1* | 11/2017 | Park | G02B 7/08 |
| 2019/0219892 A1* | 7/2019 | Park | G02B 27/646 |
| 2019/0369463 A1* | 12/2019 | Park | H02K 41/0356 |

* cited by examiner

OPTICAL ELEMENT DRIVING MECHANISM

CROSS-REFERENCE TO RELATED APPLICATIONS

The present application claims priority of U.S. Provisional Patent Application No. 63/041,459 filed on Jun. 19, 2020, and U.S. Provisional Patent Application No. 63/065,865 filed on Aug. 14, 2020, and China Patent Application No. 202022232925.2 filed on Oct. 9, 2020, the entirety of which are incorporated by reference herein.

BACKGROUND OF THE DISCLOSURE

Field of the Disclosure

The present disclosure relates to an optical element driving mechanism, and more particularly to an optical element driving mechanism of an electrical device.

Description of the Related Art

As the relevant technologies have developed, many electronic devices (such as cameras and smartphones) may record images and videos. However, when a lens having a long focal length is provided in an electronic device, the thickness thereof may be increased, impeding the prospects for miniaturization of the electronic device. Therefore, how to design a lens that may see far and has a large amount of light and maintain the lightness and thinness of the electronic device has become an important issue.

BRIEF SUMMARY OF THE DISCLOSURE

To solve the problems of the prior art, an optical element driving mechanism is provided, including a fixed part; a movable part, movable relative to the fixed part, and connected to an optical element; a driving assembly, driving the movable part to move relative to the fixed part; and a supporting assembly. The movable part is movable relative to the fixed part via the supporting assembly in a range of motion.

In one of the embodiments of the present disclosure, the movable part comprises a movable part contacting element, the fixed part comprises a fixed part contacting element, and the supporting assembly comprises a lubricating element, and a fulcrum element. The fulcrum element is in direct contact with the movable part contacting element. The fulcrum element is movable relative to at least one of the fixed part and the movable part. The fulcrum element is located between the fixed part and the movable part, and is fixedly connected to the movable part. The fulcrum element has an arc-shaped surface. The movable part contacting element has a plate-like structure and a metal material. The fixed part contacting element has a plate-like structure and a metal material, In one of the embodiments of the present disclosure, the fulcrum element is in direct contact with the fixed part contacting element. The lubricating element is in direct contact with the fixed part. The lubricating element in direct contact with the fulcrum element and the fixed part contacting element.

In one of the embodiments of the present disclosure, the fixed part further comprises a protruding structure, and the movable part further comprises a recessed structure. The optical element adjusts a traveling direction of a light from a first direction to a second direction, and the first direction is not parallel to the second direction. The movable part at least partially overlaps the fulcrum element when viewed along the second direction. The protruding structure extends along the second direction. The fulcrum element is disposed on the protruding structure, and the fulcrum element is at least partially disposed in the recessed structure. A recessed structure surface of the recessed structure is recessed along the second direction, and is perpendicular to the second direction.

In one of the embodiments of the present disclosure, the recessed structure surface faces toward the fixed part. A center of the fulcrum element overlaps recessed structure when viewed along the first direction.

In one of the embodiments of the present disclosure, the optical element driving mechanism further comprising an elastic assembly, the movable being movably connected to the fixed part via the elastic assembly, the elastic assembly comprising a fixed part fixing end, fixedly connected to the fixed part; a movable part fixing end, fixedly connected to the movable part; and a elastic portion, the movable part fixing end being movable relative to the fixed part fixing end via the elastic portion. The elastic assembly has a plate-like structure.

In one of the embodiments of the present disclosure, in a direction that is perpendicular to the elastic assembly, a gap between a center of the fixed part fixing end and a center of the movable part fixing end is greater than zero. The optical element adjusts a traveling direction of a light from a first direction to a second direction, and the first direction is not parallel to the second direction. The fixed part fixing end does not overlap the movable part fixing end when viewed along the first direction. The elastic assembly is perpendicular to the second direction. An extending direction of the elastic member is parallel to the recessed structure surface.

In one of the embodiments of the present disclosure, the optical element driving mechanism further comprising a circuit assembly, the circuit assembly comprising a ground circuit. The optical element adjusts a traveling direction of a light from a first direction to a second direction, and the first direction is not parallel to the second direction. The fixed part comprises a base, and the base comprises: a bottom plate, not parallel to the first direction and has a plastic material; a base sidewall, parallel to the first direction and extending from the bottom plate; a base connecting portion recess; and a base connecting portion, located at the bottom plate, disposed in the base connecting portion recess, and electrically connected to the ground circuit. The base connecting portion is not revealed to the base connecting portion recess when viewed in a third direction that is perpendicular to the first direction and the second direction.

In one of the embodiments of the present disclosure, the fixed part further comprises an outer frame, and the base further comprises a base outer periphery. The frame comprises: a top surface, not parallel to the first direction; an outer frame sidewall, parallel to the first direction and the base sidewall, and extending from an edge of the top surface; and a frame connecting portion, having a plate-like structure, and located on the outer frame sidewall. The base sidewall is closer to the to the movable part than the outer frame sidewall when viewed along the first direction. The outer frame connecting portion is fixedly connected to the base connecting portion. The base connecting portion has a plate-like structure, and the outer frame connecting portion is not parallel to the base connecting portion.

In one of the embodiments of the present disclosure, a base connecting portion boundary of the base connecting portion is located between an outer frame connecting portion boundary of the outer frame connecting portion and the movable part when viewed along the first direction. A shortest distance between the base connecting portion and the outer frame connecting portion is shorter than a shortest distance between the bottom plate and the outer frame connecting portion. The outer frame connecting portion covers the base connecting portion when viewed along the first direction. The base connecting portion is higher than the base outer periphery when viewed in a direction that is perpendicular to the first direction.

In one of the embodiments of the present disclosure, the optical element driving mechanism further comprising a circuit assembly, electrically connected to the driving assembly. The driving assembly comprises a first coil, and the first coil comprises a first lead. The circuit assembly comprises: a circuit element, comprising an circuit element surface and a first circuit element receiving portion, and having a plate-like structure; and a reinforcement element, having a metal material, and fixedly disposed on the circuit element. The circuit element further comprises a circuit element revealed portion, revealed to the reinforcement element. The first circuit element receiving portion is located on the circuit element and receives the first lead.

In one of the embodiments of the present disclosure, the first coil and the first circuit element receiving portion are disposed on the of circuit element surface. The base portion is revealed to the circuit element when viewed along a first direction. The reinforcement element has a plate-like structure. The reinforcement element does not have a magnetic conductive material. The first circuit element receiving portion has an opening structure.

In one of the embodiments of the present disclosure, the optical element driving mechanism further comprises an adhering element. The circuit element comprises a circuit element electrode, disposed on the circuit element surface. The circuit element surface faces toward the first coil and faces the movable part. The first lead is electrically connected to the circuit element electrode. The circuit element at least partially overlaps the first lead when viewed in an extending direction of the circuit element. The fixed part comprises a base, and the base comprises a bottom plate. The circuit element is located between the reinforcement element and the bottom plate.

In one of the embodiments of the present disclosure, a circuit element boundary of the circuit element is located between a reinforcement element boundary of the reinforcement element and a bottom plate boundary of the bottom plate when view along the first direction. The reinforcement element boundary, the circuit element boundary and the bottom plate boundary when view along the first direction. The driving assembly further comprises a second coil, and the base further comprises an overflow groove and a circuit member. The adhering element is in direct contact with the reinforcement element boundary, the circuit element boundary and the bottom plate boundary. The bottom plate boundary is located on the overflow groove. The overflow groove limits a disposed range of the adhering element. The second coil is electrically connected to the circuit assembly via the circuit member. The first coil is directly electrically connected to the circuit assembly.

In one of the embodiments of the present disclosure, the optical element driving mechanism further comprising an adhering element, wherein the second coil comprises a second lead. The circuit element further comprises a second circuit element receiving portion, corresponding to the second lead. The adhering element is provided between the circuit element and the base.

In one of the embodiments of the present disclosure, the circuit element revealed portion is covered by the adhering element when viewed along the first direction. The circuit element at least partially overlaps the adhering element when viewed in a direction that is perpendicular to the first direction.

In one of the embodiments of the present disclosure, the optical element driving mechanism further comprising a circuit assembly, electrically connected to the driving assembly, and the circuit assembly comprises a circuit element. The fixed part comprises a base, the base comprises a second base sidewall and a base electrical connection portion that is embedded in the second base sidewall.

In one of the embodiments of the present disclosure, the driving assembly comprises: a first coil, directly electrically connected to the circuit element; and a second coil, electrically connected to the circuit element via the base electrical connection portion.

In one of the embodiments of the present disclosure, the optical element driving mechanism further comprising an elastic assembly and a damping element. The damping element is disposed between at least one of the fixed part and the movable part and the elastic assembly. The fixed part comprises: a fixed part contacting element, comprising a spring; a void structure, corresponding to the fixed part contacting element; a base, comprising a bottom plate and a base connecting portion, the base connecting portion being embedded into the bottom plate; and an outer frame, comprising an outer frame connecting portion, the outer frame connecting portion being perpendicular to the base connecting portion and being fixedly connected to the base connecting portion by welding.

In one of the embodiments of the present disclosure, the movable part comprises a movable part contacting element. The supporting assembly comprises: a fulcrum element, having a spherical structure; and a lubricating element, in direct contact with the movable part or the fixed part, and in direct contact with the movable part contacting element or the fixed part contacting element. The optical element adjusts a traveling direction of a light from a first direction to a second direction, and the first direction is perpendicular to the second direction.

BRIEF DESCRIPTION OF THE DRAWINGS

The disclosure can be more fully understood by reading the subsequent detailed description and examples with references made to the accompanying drawings, wherein.

DETAILED DESCRIPTION OF THE DISCLOSURE

The making and using of optical element driving mechanisms of embodiments of the present disclosure are discussed in detail below. It should be appreciated, however, that the embodiments provide many applicable inventive concepts that may be embodied in a wide variety of specific contexts. The specific embodiments discussed are merely illustrative of specific ways to make and use the embodiments and do not limit the scope of the disclosure.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
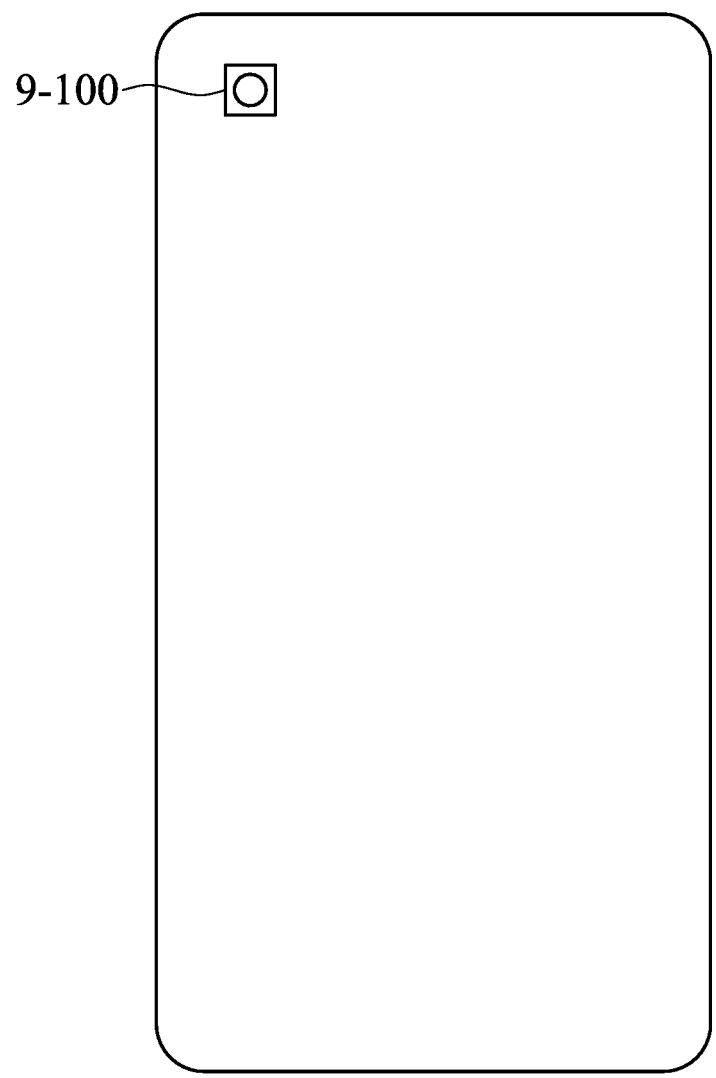
FIG. 1 shows a schematic view of an electrical device with an optical element driving mechanism according to an embodiment of the present disclosure.

Firstly, please refer to FIG. 1, an optical element driving mechanism 9-100 of an embodiment of the present disclosure may be mounted in an electrical device 9-1 for taking photos or videos, wherein the aforementioned electrical device 9-1 may, for example, be a smartphone or a digital camera, but the present disclosure is not limited to these. It should be noted that the position and the size between the optical element driving mechanism 9-100 and the electrical device 9-1 shown in FIG. 1 are only an example, which is not for limiting the position and the size between the optical element driving mechanism 9-100 and the electrical device 9-1. In fact, according to different needs, the optical element driving mechanism 9-100 may be mounted at different positions in the electrical device 9-1.

Figure 2:
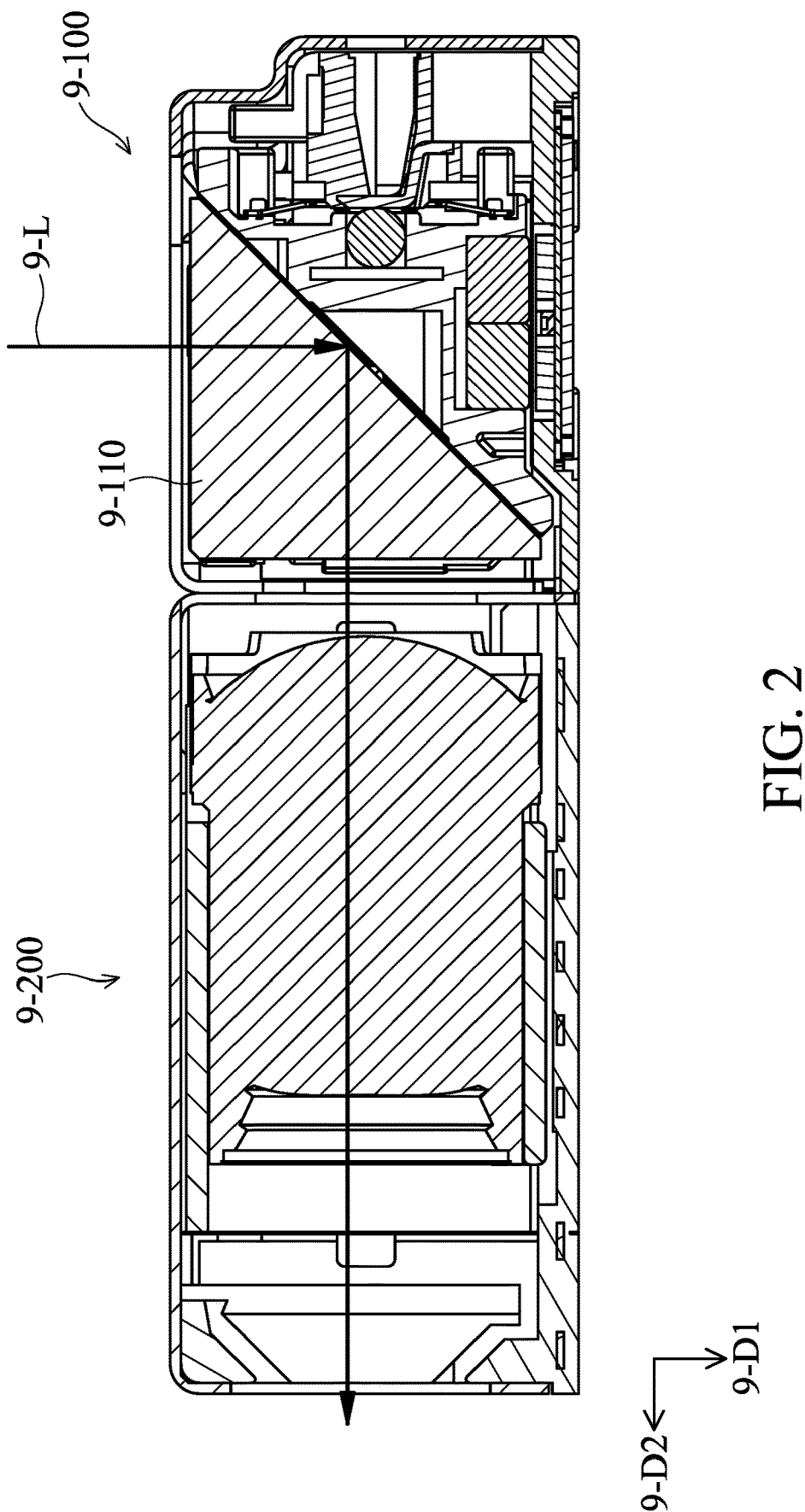
FIG. 2 shows a schematic view of the optical element driving mechanism and a lens module according to an embodiment of the present disclosure.

Please refer to FIG. 2, the optical element driving mechanism 9-100 carries an optical element 9-110. A lens module 9-200 may be disposed outside of the optical element driving mechanism 9-100. The lens module 9-200 is located at the downstream of the light entry of the optical element driving mechanism 9-100. A light 9-L incident to the optical element 9-110 of the optical element driving mechanism 9-100 along a first direction 9-D1, and then reflected by the optical element 9-110 to pass through the lens module 9-200 along a second direction 9-D2 that is not parallel to (or perpendicular to) the first direction 9-D1 for imaging.

Figure 3:
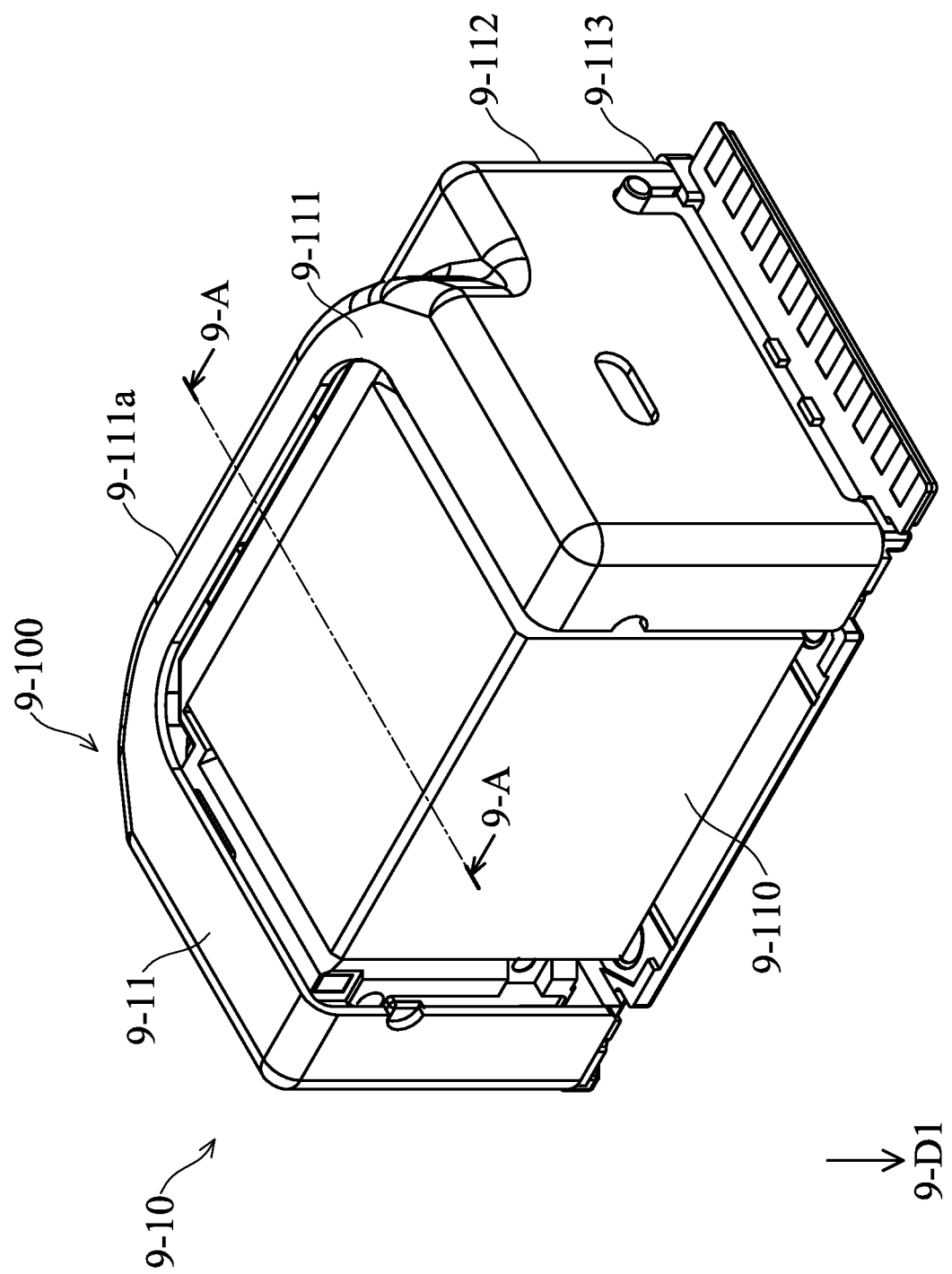
FIG. 3 shows a perspective view of the optical element driving mechanism and an optical element according to an embodiment of the present disclosure.
Figure 4:
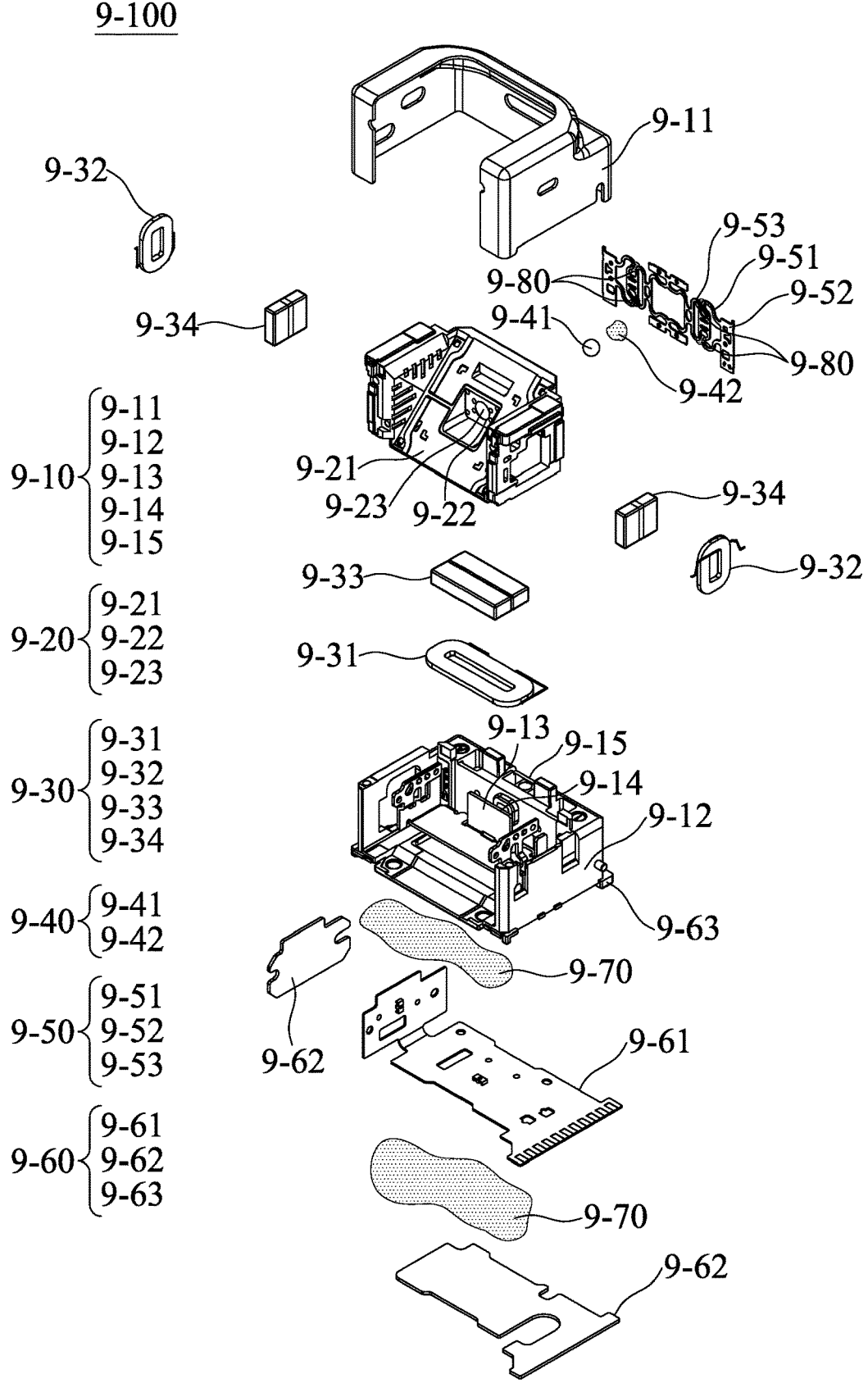
FIG. 4 shows an exploded view of the optical element driving mechanism according to an embodiment of the present disclosure.

Please refer to FIG. 3 and FIG. 4, the optical element driving mechanism 9-100 includes a fixed part 9-10, a movable part 9-20, a driving assembly 9-30, a supporting assembly 9-40, an elastic assembly 9-50, a circuit assembly 9-60, a plurality of adhering elements 9-70 and a plurality of damping elements 9-80. The movable part 9-20 is movably connected to the fixed part 9-10 via the elastic assembly 9-50. Moreover, the movable part 9-20 is movable relative to the fixed part 9-10. More specifically, the movable part 9-20 may move relative to the fixed part 9-10 in a range of motion (which will be described in detail below) via the supporting assembly 9-40.

Figure 9:
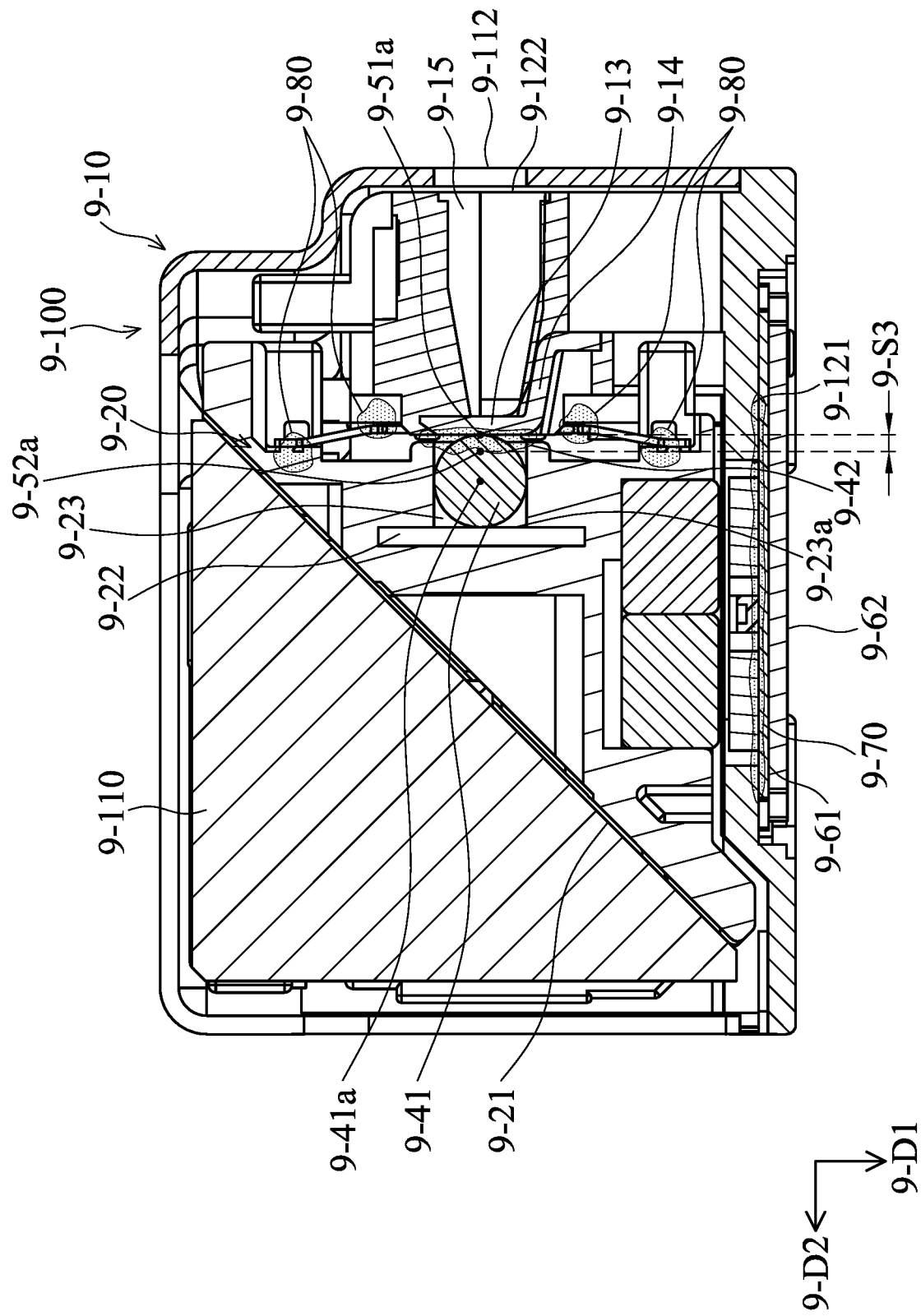
FIG. 9 shows a cross-sectional view of the optical element driving mechanism and the optical element along line 9-A-9-A of FIG. 3, according to an embodiment of the present disclosure.

The fixed part 9-10 comprises an outer frame 9-11, a base 9-12, a fixed part contacting element 9-13, a protruding structure 9-14 and a void structure 9-15 (the details are shown if FIG. 9). The movable part 9-20 includes an optical element holder 9-21, a movable part contacting element 9-22, and a recessed structure 9-23 (the details are shown if FIG. 9). The driving assembly 9-30 includes a first coil 9-31, two second coils 9-32, a first magnetic element 9-33, and two second magnetic elements 9-34. The supporting assembly 9-40 includes a fulcrum element 9-41 and a lubricating element 9-42. The elastic assembly 9-50 includes a fixed part fixing end 9-51, a movable part fixing end 9-52 and an elastic portion 9-53. The circuit assembly 9-60 includes a circuit element 9-61, two reinforcement elements 9-62, and a ground circuit 9-63.

Figure 5:
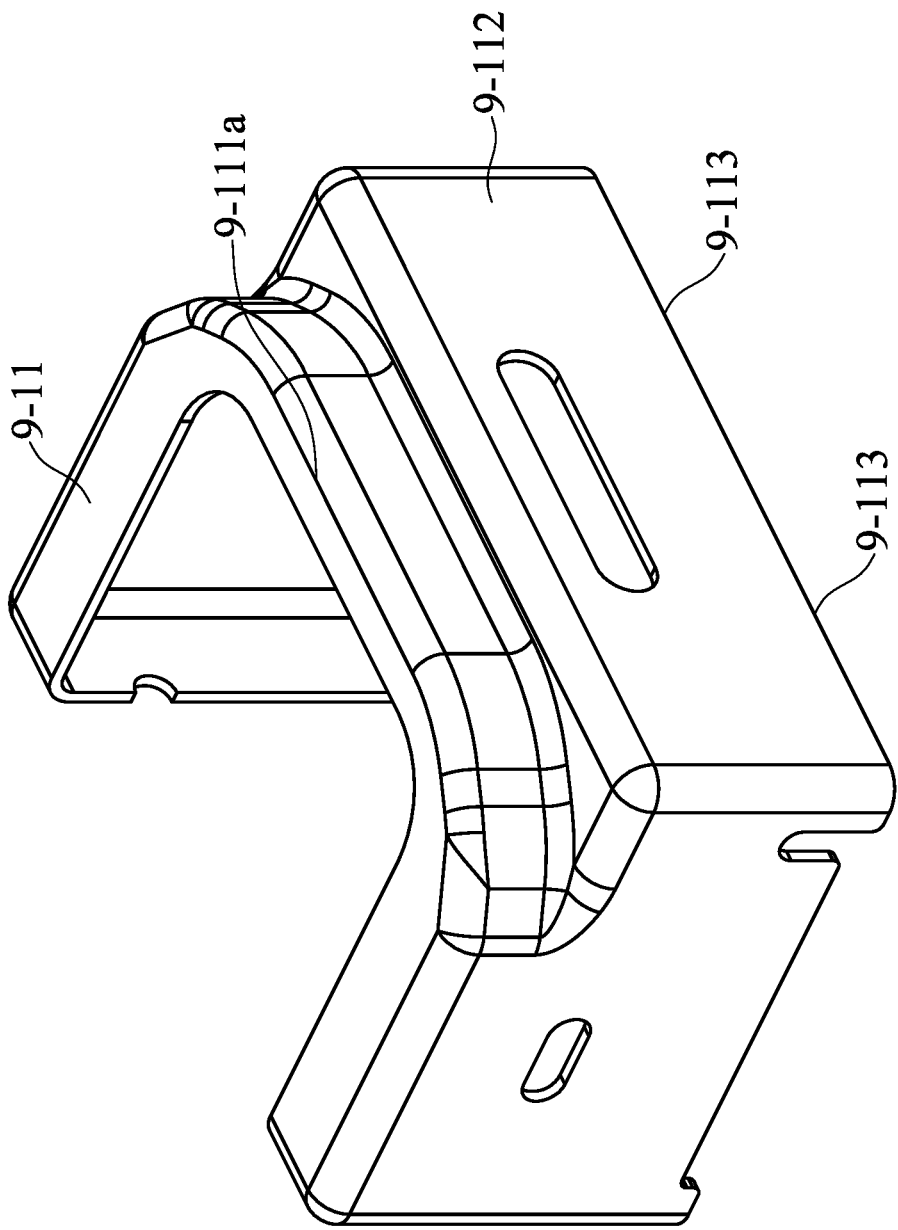
FIG. 5 shows a perspective view of an outer frame of the optical element driving mechanism according to an embodiment of the present disclosure.

Please refer to FIG. 3 and FIG. 5, the outer frame 9-11 of the fixed part 9-10 includes a top surface 9-111, an outer frame sidewall 9-112 and two outer frame connecting portions 9-113. The top surface 9-111 is not parallel to the first direction 9-D1. The outer frame sidewall 9-112 is parallel to the first direction 9-D1, and the outer frame sidewall 9-112 extends from an edge 9-111a of the top surface 9-111. The outer frame connecting portion 9-113 has a plate-like structure, and the outer frame connecting portion 9-113 is located on the outer frame sidewall 9-112.

Figure 6:
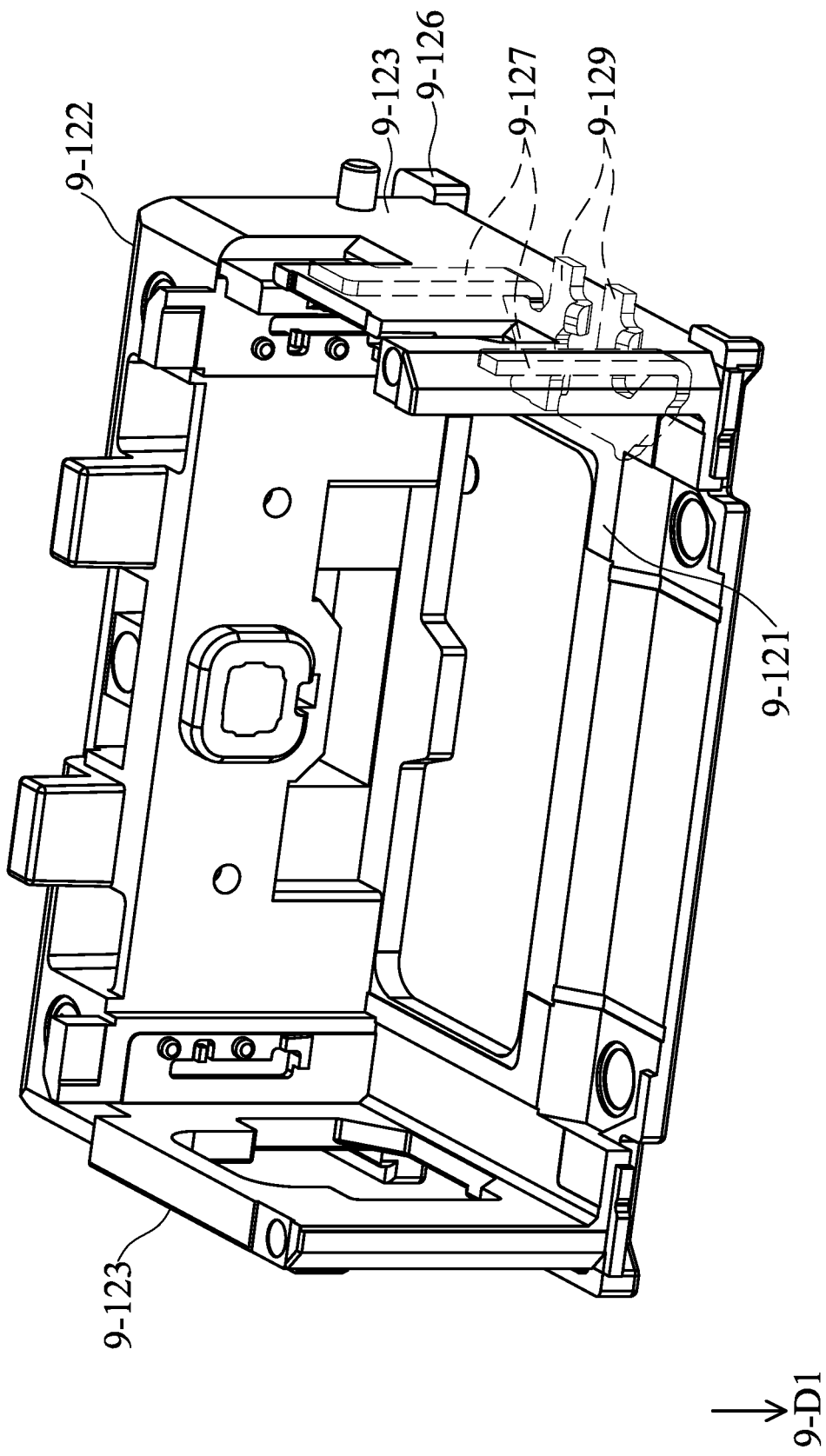
FIG. 6 shows a perspective view of a base of the optical element driving mechanism according to an embodiment of the present disclosure.
Figure 7:
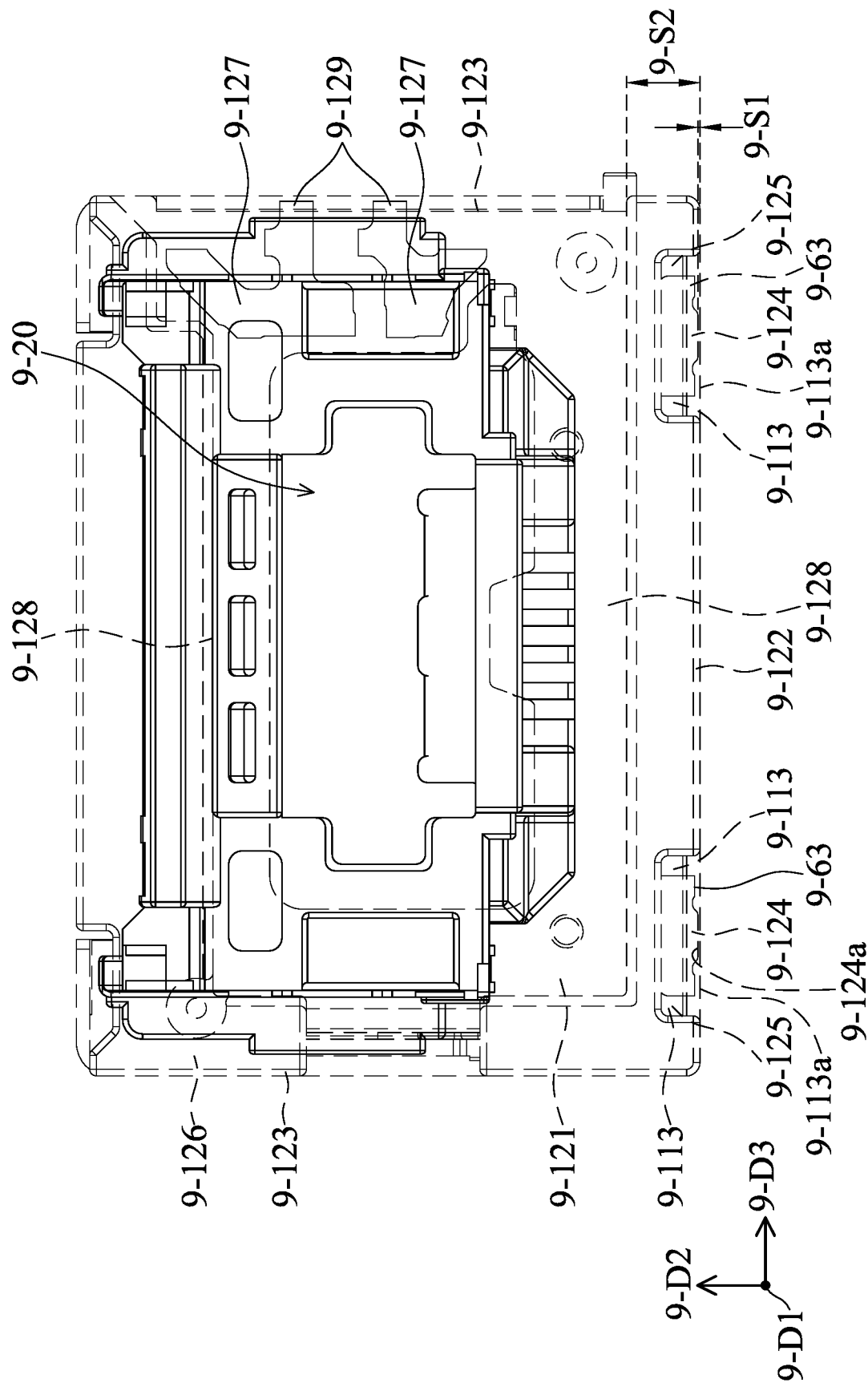
FIG. 7 shows a bottom view of the outer frame, the base, and a ground circuit of the optical element driving mechanism according to an embodiment of the present disclosure, wherein the outer frame is shown as a dash-line.

Please refer FIG. 6 and FIG. 7, the base 9-12 of the fixed part 9-10 includes a bottom plate 9-121, a first base sidewall 9-122, two second base sidewall 9-123, two base connecting portions 9-124, two base connecting portion recesses 9-125, a base outer periphery 9-126, a base electrical connection portion 9-127, two glue overflow grooves 9-128, and a circuit member 9-129.

The bottom plate 9-121 is not parallel to the first direction 9-D1, and the bottom plate 9-121 has a plastic material. The first base sidewall 9-122 and the second base sidewall 9-123 are parallel to the first direction 9-D1, and they extend from the bottom plate 9-121. Further, the first base sidewall 9-122 is substantially perpendicular to the second base sidewalls 9-123. Since the outer frame sidewall 9-112 is also parallel to the first direction 9-D1, therefore, the first base sidewall 9-122 is parallel to the outer frame sidewall 9-112. the first base sidewall 9-122 is closer to the movable part 9-20 than the outer frame sidewall 9-112 when viewed along the first direction 9-D1.

The base connecting portion 9-124 has a plate-like structure. The base connecting portion 9-124 is located on the bottom plate 9-121, and the base connecting portion 9-124 is at least partially embedded in the bottom plate 9-121. The base connecting portion 9-124 is disposed in the base connecting portion recess 9-125. The base connecting portion 9-124 does not reveal to the base connecting portion recess 9-125 when view along a third direction 9-D3 that is perpendicular to the first direction 9-D1 and the second direction 9-D2. The outer frame connecting portion 9-113 covers the base connecting portion 9-124 when viewed along the first direction 9-D1. In one embodiment, the outer frame connecting portion 9-113 is fixedly connected to the base connecting portion 9-124, and the outer frame connecting portion 9-113 is not parallel to the base connecting portion 9-124. In one embodiment, the outer frame connecting portion 9-113 is perpendicular to the base connecting portion 9-124 (may refer to FIG. 8), and the outer frame connecting portion 9-113 is fixedly connected to the base connecting portion 9-124 via welding. Thus, the structure of the optical element driving mechanism 9-100 may be intensified.

Please refer to FIG. 7, a base connecting portion boundary 9-124a of the base connecting portion 9-124 is located between an outer frame connecting portion boundary 9-113a of the outer frame connecting portion 9-113 and the movable part 9-20 when viewed along the first direction 9-D1. A shortest distance 9-S1 between the base connecting portion 9-124 and the outer frame connecting portion 9-113 is shorter than a shortest distance 9-S2 between the bottom plate 9-121 and the outer frame connecting portion 9-113, and this structure may improve the assembling accuracy of the base and the outer frame and may make the base connecting portion and the outer frame connecting portion contact reliably, so as to improve the welding accuracy and strength.

Figure 8:
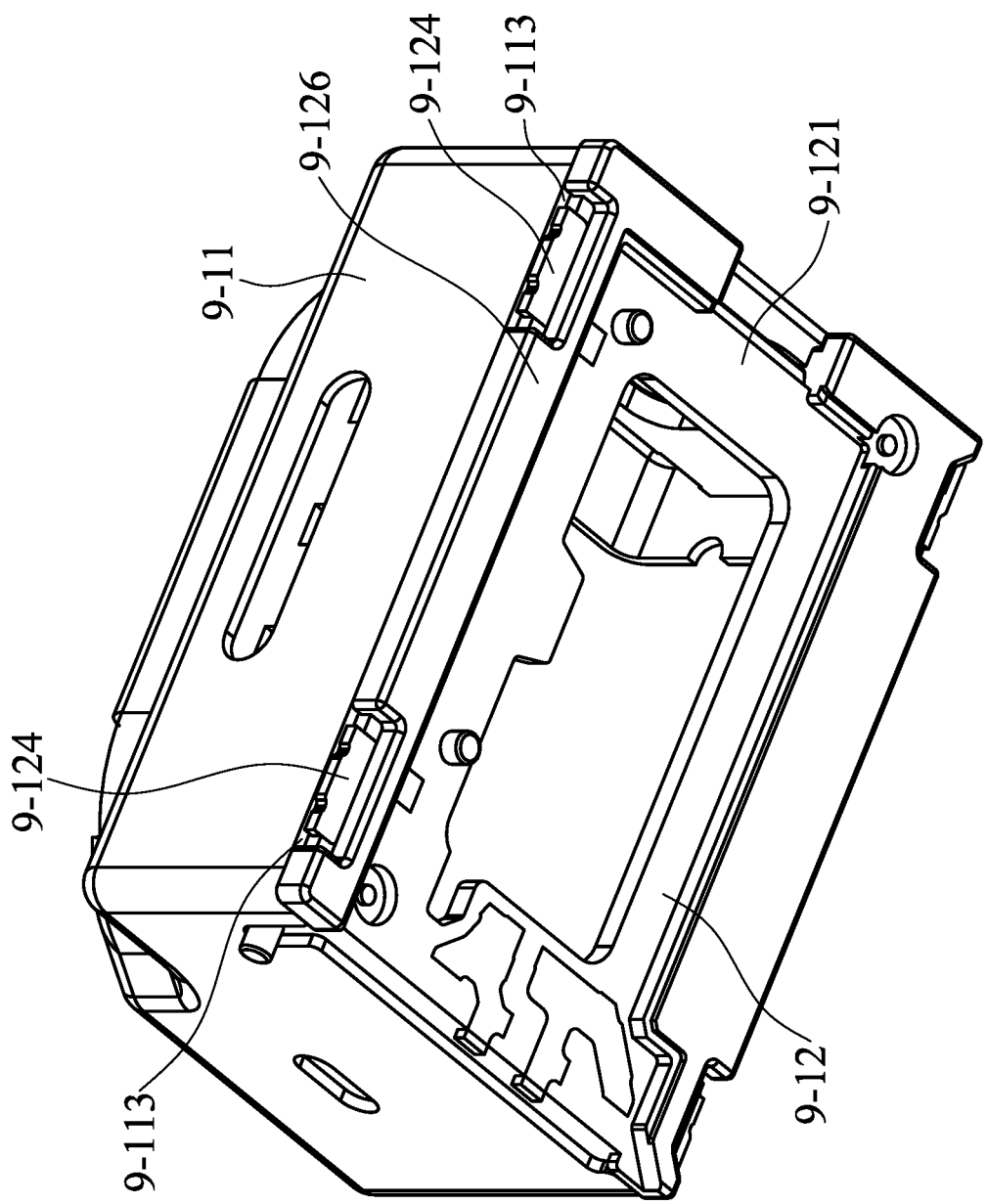
FIG. 8 shows a perspective view of the outer frame and the base of the optical element driving mechanism according to an embodiment of the present disclosure.

Please refer to FIG. 8, the base outer periphery 9-126 surrounds the bottom plate 9-121. Moreover, the base connecting portion 9-124 is higher than the base outer periphery 9-126 when viewed along a direction that is perpendicular to the first direction 9-D1. The base electrical connection portion 9-127 is embedded in the second base sidewall 9-123 of the base 9-12 (FIG. 6).

Please refer to FIG. 9, in one embodiment, the fixed part contacting element 9-13 may have a plate-like structure, and the fixed part contacting element 9-13 has a metal material. The protruding structure 9-14 extends along the second direction 9-D2 and is connected to the fixed part contacting element 9-13. The void structure 9-15 may extend along the second direction 9-D2. The void structure 9-15 corresponds to the fixed part contacting element 9-13. That is, the void structure 9-15 extends from the first base sidewall 9-122 to the fixed part contacting element 9-13. The void structure 9-15 may be helpful to position and fix of the fixed part contacting element 9-13 and may reduce the weight of the optical element driving mechanism 9-100, thereby miniaturizing optical element driving mechanism 9-100.

The movable part 9-20 is in contact with and is connected to the optical element 9-110. Specifically, the optical element holder 9-21 of the movable part 9-20 carries and is connected to the optical element 9-110. The optical element holder 9-21 may have any shape that is suitable for carrying and connecting to the optical element 9-110. For example, the optical element holder 9-21 may be a surface having a recess (may refer to FIG. 4).

The movable part contacting element 9-22 of the movable part 9-20 may have a plate-like structure and have a metal material. The movable part contacting element 9-22 may correspond to the fixed part contacting element 9-13. The recessed structure 9-23 of the movable part 9-20 has a recessed structure surface 9-23a. The recessed structure surface 9-23a is recessed along the second direction 9-D2 and is perpendicular to the second direction 9-D2. That is, the recessed structure surface 9-23a faces the fixed part 9-10.

Figure 10:
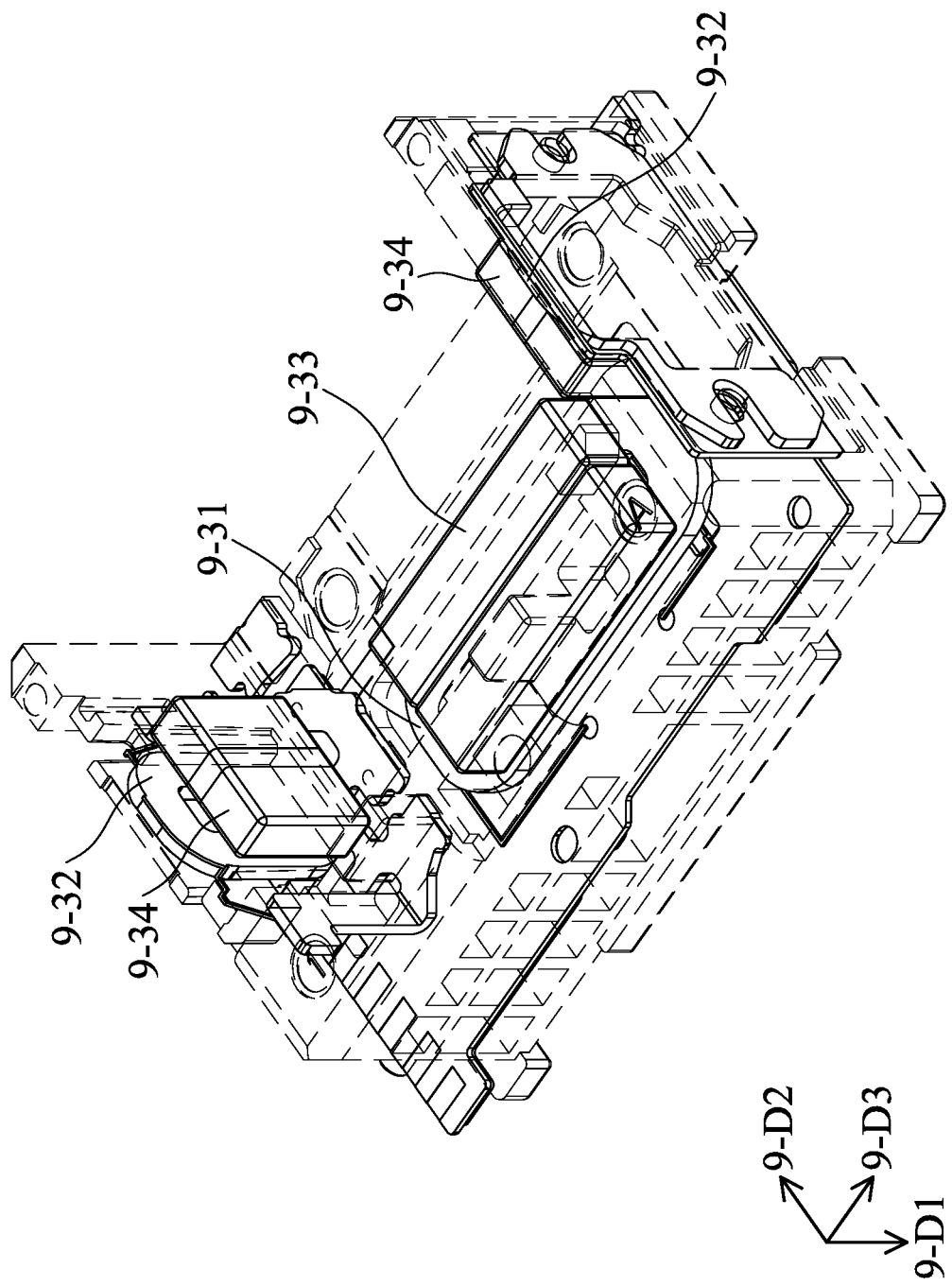
FIG. 10 shows a perspective view of the base, a driving assembly, and a circuit element of the optical element driving mechanism according to an embodiment of the present disclosure, wherein the base is shown as a dash-line.

Please refer to FIG. 10, the first coil 9-31 of the driving assembly 9-30 corresponds to the first magnetic element 9-33, and the second coil 9-32 corresponds to the second magnetic element 9-34. The first coil 9-31 may interact with the magnetic field of the first magnetic element 9-33 and generate electromagnetic driving force to drive the optical element holder 9-21 of the movable part 9-20 and the optical element 9-110 to move about the first direction 9-D1. The second coil 9-32 may interact with the magnetic field of the second magnetic element 9-34 and generate electromagnetic driving force to drive the optical element holder 9-21 of the movable part 9-20 and the optical element 9-110 to move about the third direction 9-D3. Therefore, the optical element holder 9-21 of the movable part 9-20 and the optical element 9-110 may move in the range of motion (about the first direction 9-D1 or about the third direction 9-D3). The first coil 9-31 includes a first lead 9-311, and the second coil 9-32 includes a second lead 9-321, which will be described later.

Please return to FIG. 9, the fulcrum element 9-41 of the supporting assembly 9-40 is located between the fixed part 9-10 and the movable part 9-20. The fulcrum element 9-41 is disposed on the protruding structure 9-14 of the fixed part 9-10, and the fulcrum element 9-41 is at least partially disposed in the recessed structure 9-23 of the movable part 9-20. Specifically, the fulcrum element 9-41 is disposed between the protruding structure 9-14 and the recessed structure 9-23. A center 9-41a of the fulcrum element 9-41 overlaps the recessed structures 9-23 when viewed along the first direction 9-D1. Moreover, the movable part 9-20 and the fulcrum element 9-41 at least partially overlap when viewed along the second direction 9-D2. Thus, the fulcrum element 9-41 may be as close as possible to the movable part 9-20. With this structure, the position of the rotating axis is closer to the movable part, so that the optical quality will not be degraded (such as image distortion or chromatic dispersion) due to the rotating axis is too far from the optical element when rotating, and the accuracy of the position sensing can be improved, so that driving accuracy is increased.

The fulcrum element 9-41 is in direct contact with the fixed part 9-10 and the movable part 9-20. In one embodiment, the fulcrum element 9-41 is fixedly connected to the movable part 9-20 and is movable relative to the fixed part 9-10. In one embodiment, the fulcrum element 9-41 is fixedly connected to the fixed part 9-10 and is movable relative to the movable part 9-20. Specifically, the fulcrum element 9-41 is in direct contact with the fixed part contacting element 9-13 and the movable part contacting element 9-22. In one embodiment, the lubricating element 9-42 is provided between the fulcrum element 9-41 and the fixed part 9-10 (specifically, the fixed part contacting element member 9-13). Therefore, in the foregoing embodiment, the lubricating element 9-42 is in direct contact with the fixed part 9-10, and the lubricating element 9-42 is in direct contact with the fulcrum element 9-41 and the fixed part contacting element 9-13. In one embodiment, the lubricating element 9-42 is provided between the fulcrum element 9-41 and the movable part 9-20 (specifically, the movable part contacting element 9-22) (not shown in the figure). Therefore, in the foregoing embodiment, the lubricating element 9-42 is in direct contact with the movable part 9-20, and the lubricating element 9-42 is in direct contact with the fulcrum element 9-41 and the movable part contacting element 9-22.

Figure 11:
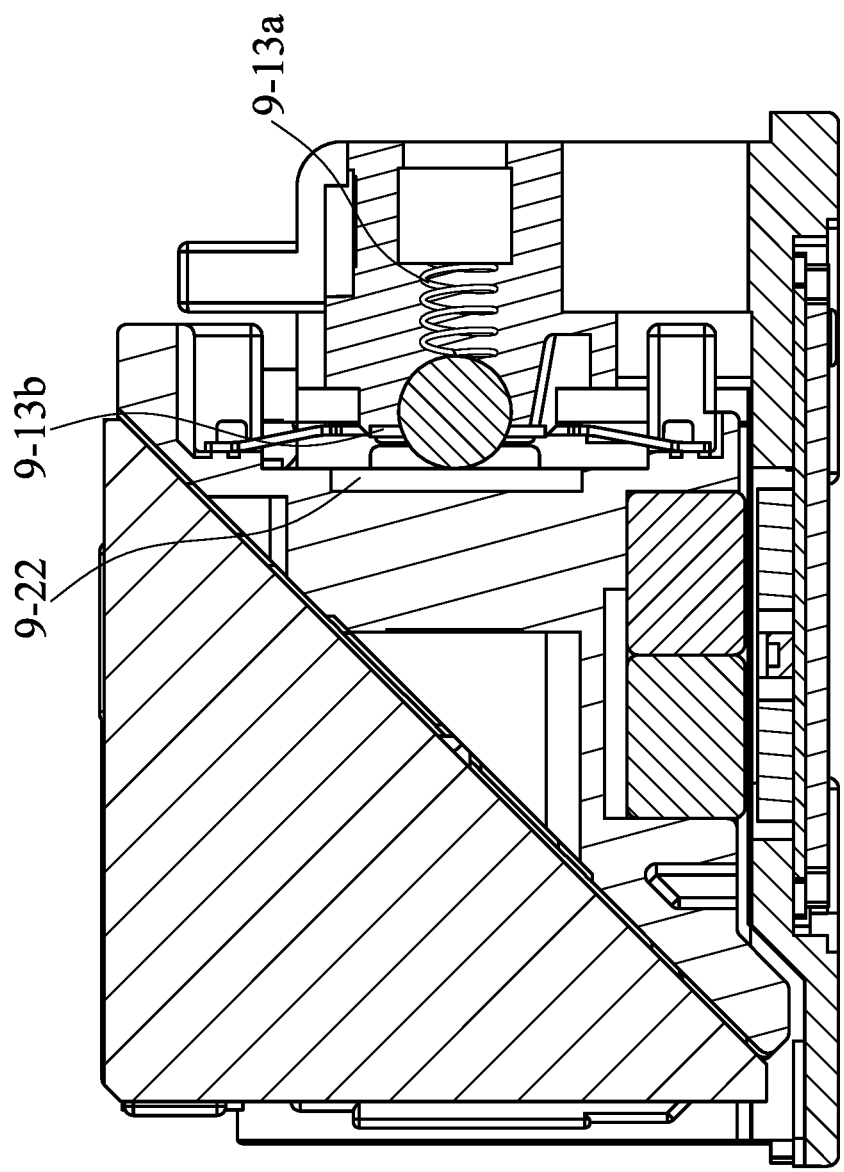
FIG. 11 shows a cross-sectional view of the optical element driving mechanism and the optical element along line 9-A-9-A of FIG. 3, according to another embodiment of the present disclosure.

As shown in FIG. 11, in one embodiment, the fixed part contacting element 9-13 may include a spring 9-13a and a ring 9-13b. The spring 9-13a may press the fulcrum element 9-41 against the ring 9-13b, so that the fulcrum element 9-41 in contact with the movable part contacting element 9-22 of the movable part 9-20.

Please return to FIG. 9, Since the fulcrum element 9-41 has a spherical structure (that is, the fulcrum element 9-41 has an arc-shaped surface), the fulcrum element 9-41 is movable (or rotatable) relative to the fixed part 9-10 (the fixed part contacting element 9-13) or the movable part 9-20 (the moving part contacting element 9-22). Thus, the optical element holder 9-21 of the movable part 9-20 and the optical element 9-110 may move in the range of motion (as described above, move about the first direction 9-D1 or move about the third direction 9-D3).

Figure 12:
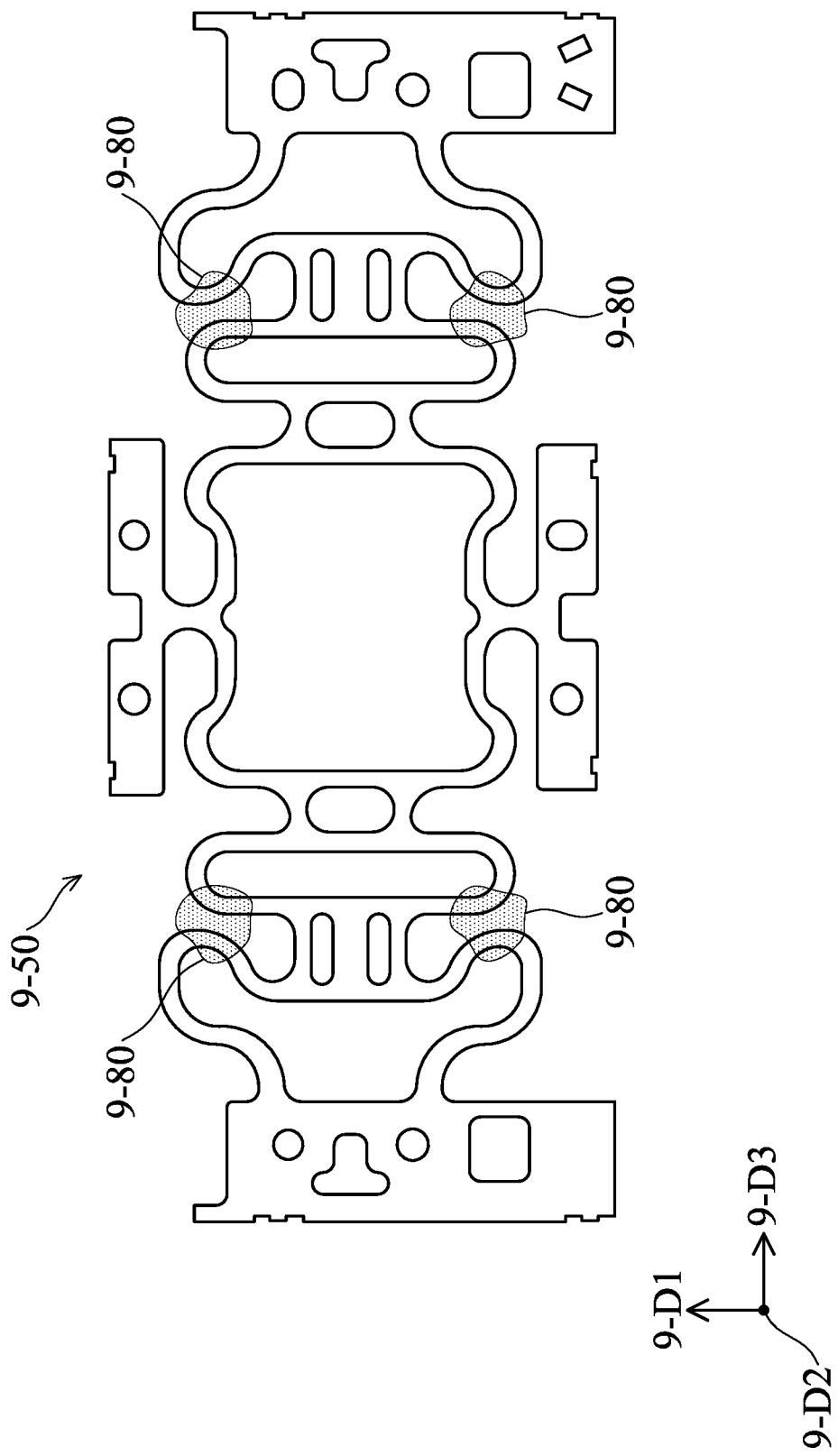
FIG. 12 shows a schematic view of an elastic assembly and a damping element of the driving assembly of the optical element driving mechanism according to an embodiment of the present disclosure.

Please refer to FIG. 9 and FIG. 12, the elastic assembly 9-50 has a plate-like structure, and the elastic assembly 9-50 is perpendicular to the second direction 9-D2. An extending direction (for example, may be the first direction 9-D1, or the third direction 9-D3) of the elastic assembly 9-50 is parallel to the recessed structure surface 9-23a. The damping element 9-80 may be disposed between the fixed part 9-10 and the elastic assembly 9-50. The damping element 9-80 may be disposed between the movable part 9-20 and the elastic assembly 9-50. The elastic assembly 9-50 is prevented from striking the fixed part 9-10 or the movable part 9-20 to cause damage when the elastic assembly 9-50 is moving.

The fixed part fixing end 9-51 of the elastic assembly 9-50 is fixedly connected to the fixed part 9-10, and the movable part fixing end 9-52 of the elastic assembly 9-50 is fixedly connected to the movable part 9-10. The movable part fixing end 9-52 is movable relative to the fixed part fixing end 9-51 via the elastic portion 9-53. The fixed part fixing end 9-51 does not overlap the movable part fixing end 9-52 when viewed along the first direction 9-D1. In other words, in a direction that is perpendicular to the elastic assembly 9-50 (for example, may be the second direction 9-D2), a gap 9-S3 between a center 9-51a of the fixed part fixing end 9-51 and a center 9-52a of the movable part fixing end 9-52 is greater than zero. As a result, the elastic assembly 9-50 may have a pre-pressure to push the fulcrum element 9-41 toward the movable part 9-20 to ensure that the fulcrum element can reliably contact the movable part in any circumstance.

Figure 13:
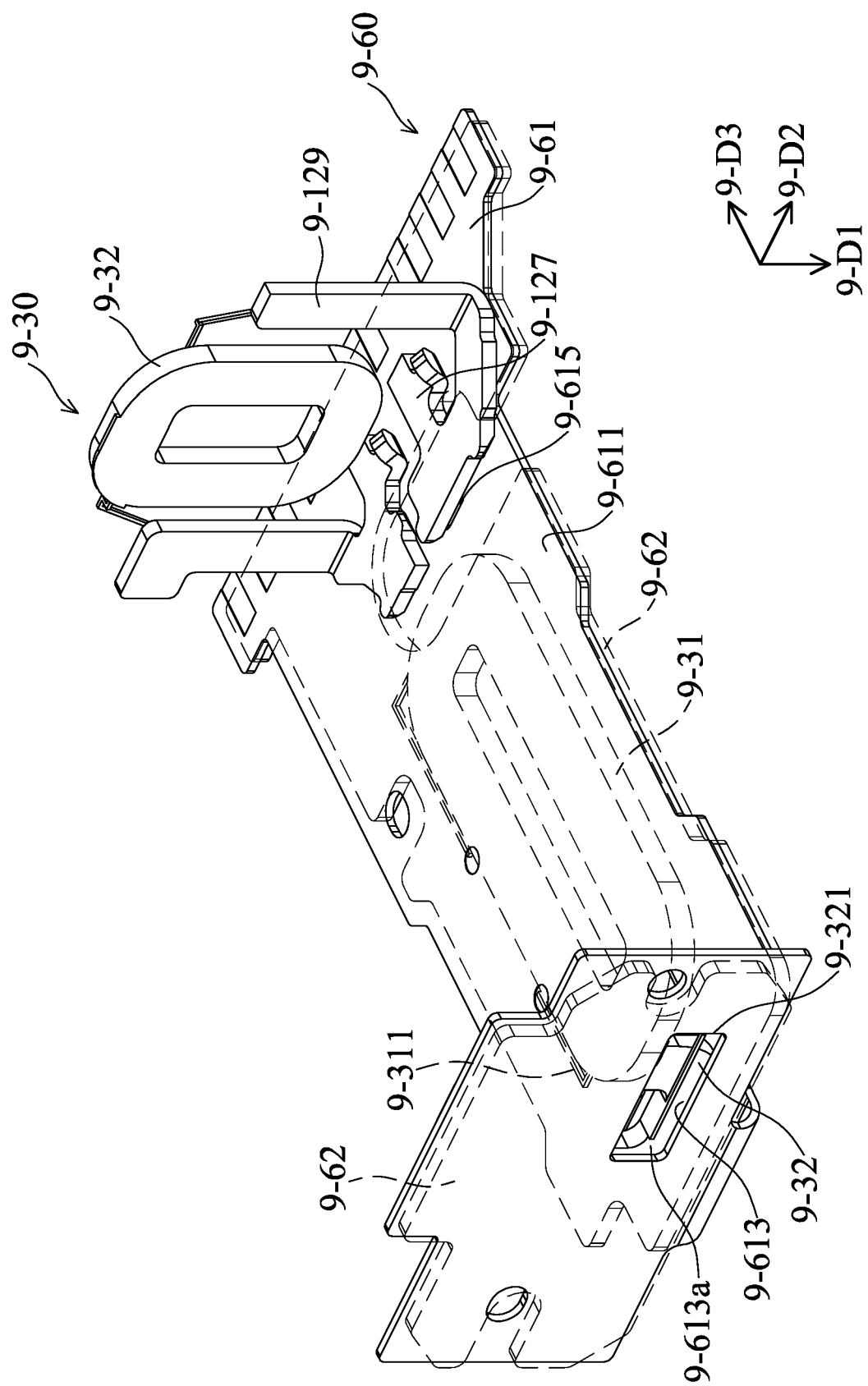
FIG. 13 shows a schematic view of a first coil, a second coil, the circuit element, and a reinforcement element of the optical element driving mechanism according to an embodiment of the present disclosure, wherein the first coil, the second coil and the reinforcement element are shown as dash-lines.
Figure 14:
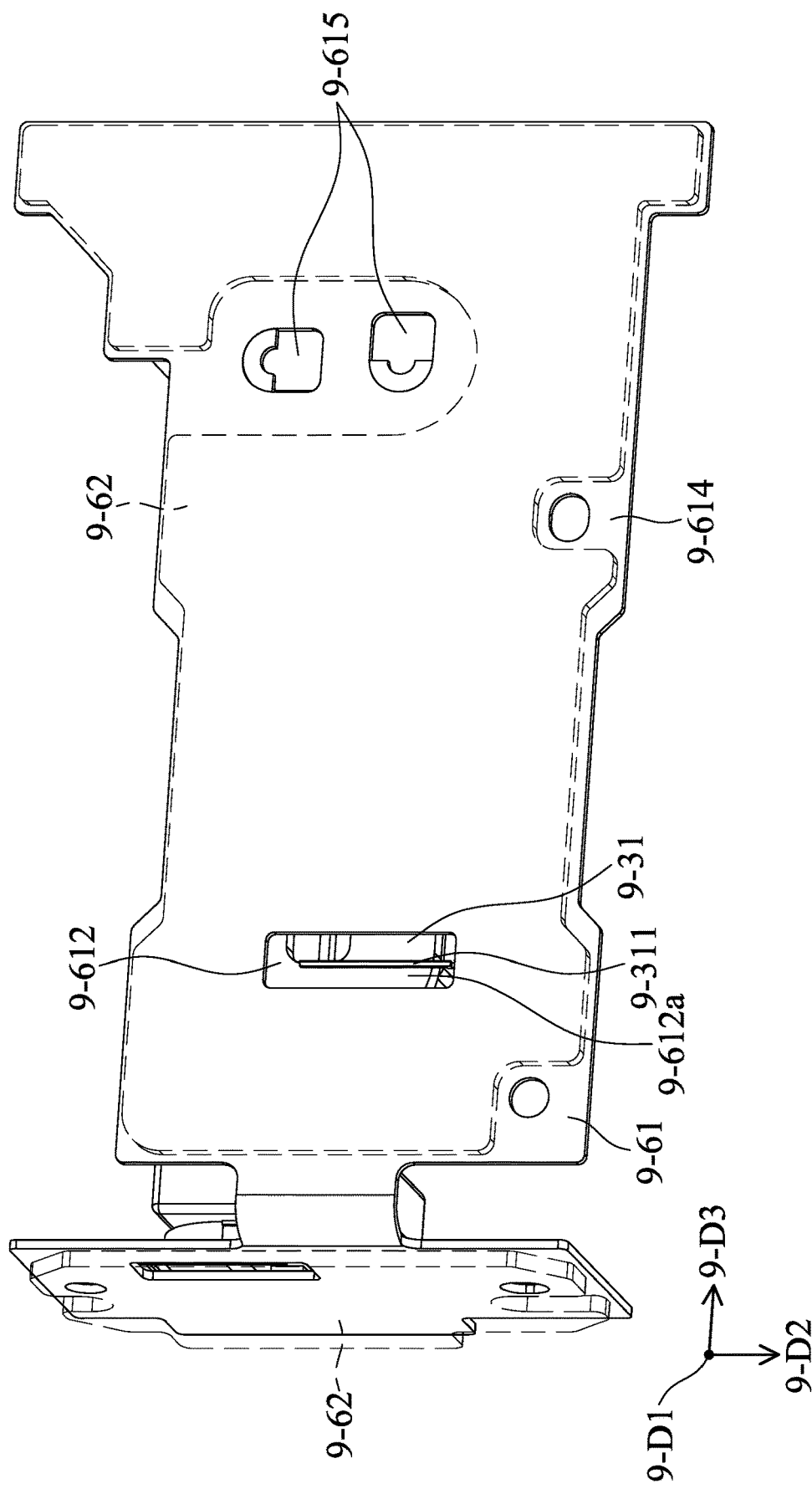
FIG. 14 shows a schematic view of the circuit element and the reinforcement element of the optical element driving mechanism according to an embodiment of the present disclosure, wherein the reinforcement element is shown as a dash-line.

Please refer to FIG. 13 and FIG. 14, the circuit assembly 9-60 is electrically connected to the driving assembly 9-30. The circuit element 9-61 of the circuit assembly 9-60 includes a circuit element surface 9-611, a first circuit element receiving portion 9-612, a second circuit element receiving portion 9-613, and a circuit element revealed portion 9-614 and a circuit element electrode 9-615.

Please refer to FIG. 9 again, the circuit element 9-61 is located between the reinforcement element 9-62 and the bottom plate 9-121, and the circuit element 9-61 has a plate-like structure. The circuit element 9-61 at least partially overlap the adhering element 9-70 when viewed in a direction that is perpendicular to the first direction 9-D1. Specifically, the adhering element 9-70 is provided between the circuit element 9-61 and the base 9-12 so as to fix the circuit element 9-61 on the base 9-12.

As shown in FIG. 13 and FIG. 14, the circuit element 9-61 at least partially overlap and the first lead 9-311 when viewed along an extending direction of the circuit element 9-61 (for example, may be the first direction 9-D1 or the third direction 9-D3). The first coil 9-31 may be directly electrically connected to the circuit element 9-61 of the circuit assembly 9-60.

The circuit member 9-129 is electrically connected to the circuit element 9-61. Therefore, the second coil 9-32 is electrically connected to the circuit element 9-61 of the circuit assembly 9-60 via the base electrical connection portion 9-127 and the circuit member 9-129.

The circuit element surface 9-611 of the circuit element 9-61 faces the first coil 9-31 and faces the movable part 9-20 (not shown in FIG. 11 or FIG. 12). The first coil 9-31 and the first circuit element receiving portion 9-612 is disposed on the circuit element surface 9-611. Moreover, the first circuit element receiving portion 9-612 has an opening structure 9-612a to receive the first lead 9-311.

The second circuit element receiving portion 9-613 and the second lead 9-321 are adjacent to the second base sidewall 9-123 (not shown in FIG. 13 and FIG. 14). The second circuit element receiving portion 9-613 corresponds to the second lead 9-321. Moreover, the second circuit element receiving portion 9-613 has an opening structure 9-613a to receive the second lead 9-321.

The circuit element electrode 9-615 is disposed on the circuit element surface 9-611, and the first lead 9-311 is electrically connected to the circuit element electrode 9-615 to electrically connect the first coil 9-31 to the circuit element 9-61.

The reinforcement element 9-62 has a plate-like structure, and the reinforcement element 9-62 has a metal material. The reinforcement element 9-62 is fixedly disposed on the circuit element 9-61. It should be noted that the reinforcement element 9-62 does not have a magnetically conductive material to avoid adverse effects on the circuit element 9-61 or the electromagnetic driving assemblies.

Please return to FIG. 7, the base connecting portions 9-124 is electrically connected to the ground circuit 9-63 to ground the optical element driving mechanism 9-100.

Figure 15:
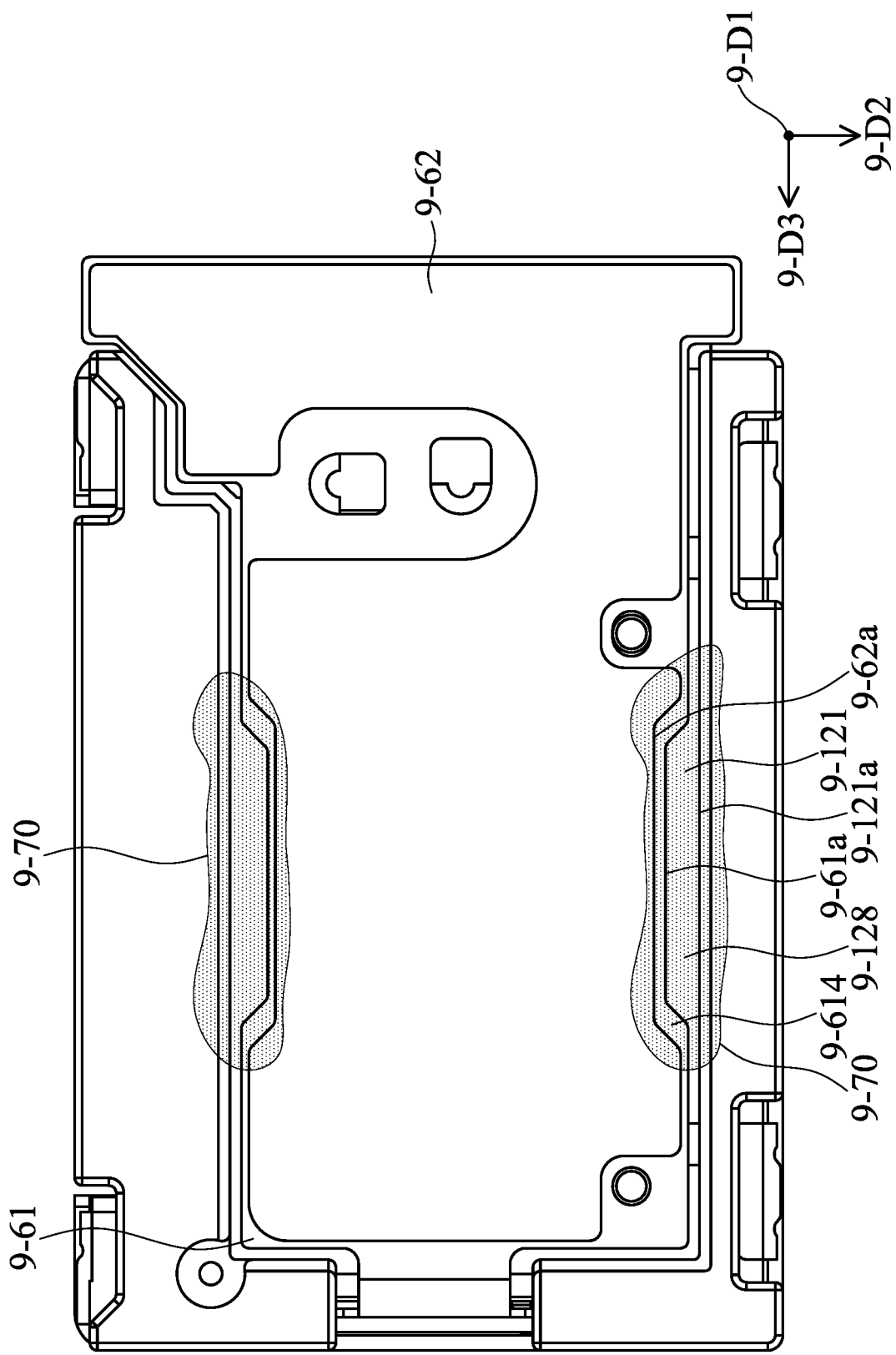
FIG. 15 shows a bottom view of the optical element driving mechanism according to an embodiment of the present disclosure.

Please refer to FIG. 15, the bottom plate 9-121 of the base 9-12 is partially revealed to the circuit element 9-61 when viewed along the first direction 9-D1. The circuit element revealed portion 9-614 is revealed to the reinforcement element 9-62. The circuit element revealed portion 9-614 is covered by the adhering element 9-70 when viewed along the first direction 9-D1. A circuit element boundary 9-61a of the circuit element 9-61 is located between a reinforcement element boundary 9-62a of the reinforcement element 9-62 and a bottom plate boundary 9-121a of the bottom plate 9-121 when view along the first direction 9-D1. The bottom plate boundary 9-121a is located on the overflow groove 9-128 and the overflow groove 9-128 may limit the disposed range of the adhering element 9-70. The adhering element 9-70 is in direct contact with the reinforcement element boundary 9-62a, the circuit element boundary 9-61a and the bottom plate boundary 9-121a. Thus, the structural strength of the optical element driving means 9-100 may be enhanced.

In summary, the movable part 9-20 of the optical element driving mechanism 9-100 of the present disclosure may move relative to the fixed part 9-10 via the fulcrum element 9-41. In this way, the movable part 9-20 and the optical element 9-110 may move relative to the fixed part 9-10 more smoothly. Moreover, a better imaging effect may be achieved by driving the optical element 9-110. Furthermore, since the fulcrum element 9-41 has a spherical structure, the supporting assembly 9-40 of the optical element driving mechanism 9-100 may be minimized, thereby achieving the effect of miniaturizing the optical element driving mechanism 9-100.

Although embodiments of the present disclosure and their advantages have been described in detail, it should be understood that various changes, substitutions and alterations may be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. An optical element driving mechanism, comprising:
   a fixed part;
   a movable part, movable relative to the fixed part, and connected to an optical element;
   a driving assembly, driving the movable part to move relative to the fixed part; and
   a supporting assembly, comprising a fulcrum element;
   wherein the movable part is movable relative to the fixed part via the supporting assembly in a range of motion,
   wherein the fulcrum element is located between the fixed part and the movable part, and is fixedly connected to the movable part,
   wherein the fulcrum element has an arc-shaped surface.

2. The optical element driving mechanism as claimed in claim 1, wherein the movable part comprises a movable part contacting element, the fixed part comprises a fixed part contacting element, and the supporting assembly further comprises a lubricating element,
   wherein the fulcrum element is in direct contact with the movable part contacting element,
   wherein the fulcrum element is movable relative to at least one of the fixed part and the movable part,
   wherein the movable part contacting element has a plate-like structure and a metal material,
   wherein the fixed part contacting element has a plate-like structure and a metal material.

3. The optical element driving mechanism as claimed in claim 2, wherein the fulcrum element is in direct contact with the fixed part contacting element,
   wherein the lubricating element is in direct contact with the fixed part,
   wherein the lubricating element is in direct contact with the fulcrum element and the fixed part contacting element.

4. The optical element driving mechanism as claimed in claim 3, wherein the fixed part further comprises a protruding structure, and the movable part further comprises a recessed structure,
   wherein the optical element adjusts a traveling direction of a light from a first direction to a second direction, and the first direction is not parallel to the second direction,
   wherein the movable part at least partially overlaps the fulcrum element when viewed along the second direction,
   wherein the protruding structure extends along the second direction,
   wherein the fulcrum element is disposed on the protruding structure, and the fulcrum element is at least partially disposed in the recessed structure,
   wherein a recessed structure surface of the recessed structure is recessed along the second direction, and is perpendicular to the second direction.

5. The optical element driving mechanism as claimed in claim 4, wherein the recessed structure surface faces toward the fixed part,
   wherein a center of the fulcrum element overlaps the recessed structure when viewed along the first direction.

6. The optical element driving mechanism as claimed in claim 1, further comprising an elastic assembly, the movable part being movably connected to the fixed part via the elastic assembly, the elastic assembly comprising:
   a fixed part fixing end, fixedly connected to the fixed part;
   a movable part fixing end, fixedly connected to the movable part; and
   an elastic portion, the movable part fixing end being movable relative to the fixed part fixing end via the elastic portion,
   wherein the elastic assembly has a plate-like structure.

7. The optical element driving mechanism as claimed in claim 6, wherein in a direction that is perpendicular to the elastic assembly, a gap between a center of the fixed part fixing end and a center of the movable part fixing end is greater than zero,
   wherein the optical element adjusts a traveling direction of a light from a first direction to a second direction, and the first direction is not parallel to the second direction,
   wherein the fixed part fixing end does not overlap the movable part fixing end when viewed along the first direction,
   wherein the elastic assembly is perpendicular to the second direction,
   wherein an extending direction of the elastic member is parallel to a recessed structure surface.

8. The optical element driving mechanism as claimed in claim 1, further comprising a circuit assembly, the circuit assembly comprising a ground circuit, wherein the optical element adjusts a traveling direction of a light from a first direction to a second direction, and the first direction is not parallel to the second direction, wherein the fixed part comprises a base, and the base comprises:
a bottom plate, not parallel to the first direction and has a plastic material;
a base sidewall, parallel to the first direction and extending from the bottom plate;
a base connecting portion recess; and
a base connecting portion, located at the bottom plate, disposed in the base connecting portion recess, and electrically connected to the ground circuit,
wherein the base connecting portion is not revealed to the base connecting portion recess when viewed in a third direction that is perpendicular to the first direction and the second direction.

9. The optical element driving mechanism as claimed in claim 8, wherein the fixed part further comprises an outer frame, and the base further comprises a base outer periphery, wherein the frame comprises:
a top surface, not parallel to the first direction;
an outer frame sidewall, parallel to the first direction and the base sidewall, and extending from an edge of the top surface; and
an outer frame connecting portion, having a plate-like structure, and located on the outer frame sidewall,
wherein the base sidewall is closer to the movable part than the outer frame sidewall when viewed along the first direction,
wherein the outer frame connecting portion is fixedly connected to the base connecting portion,
wherein the base connecting portion has a plate-like structure, and the outer frame connecting portion is not parallel to the base connecting portion.

10. The optical element driving mechanism as claimed in claim 9, wherein a base connecting portion boundary of the base connecting portion is located between an outer frame connecting portion boundary of the outer frame connecting portion and the movable part when viewed along the first direction,
wherein a shortest distance between the base connecting portion and the outer frame connecting portion is shorter than a shortest distance between the bottom plate and the outer frame connecting portion,
wherein the outer frame connecting portion covers the base connecting portion when viewed along the first direction,
wherein the base connecting portion is higher than the base outer periphery when viewed in a direction that is perpendicular to the first direction.

11. The optical element driving mechanism as claimed in claim 1, further comprising a circuit assembly, electrically connected to the driving assembly,
wherein the driving assembly comprises a first coil, and the first coil comprises a first lead,
wherein the circuit assembly comprises:
a circuit element, comprising an circuit element surface and a first circuit element receiving portion, and having a plate-like structure; and
a reinforcement element, having a metal material, and fixedly disposed on the circuit element,
wherein the circuit element further comprises a circuit element revealed portion, revealed to the reinforcement element,
wherein the first circuit element receiving portion is located on the circuit element and receives the first lead.

12. The optical element driving mechanism as claimed in claim 11, wherein the first coil and the first circuit element receiving portion are disposed on the circuit element surface,
wherein the base is partially revealed to the circuit element when viewed along a first direction,
wherein the reinforcement element has a plate-like structure,
wherein the reinforcement element does not have a magnetic conductive material,
wherein the first circuit element receiving portion has an opening structure.

13. The optical element driving mechanism as claimed in claim 12, further comprises an adhering element,
wherein the circuit element comprises a circuit element electrode, disposed on the circuit element surface,
wherein the circuit element surface faces toward the first coil and faces the movable part,
wherein the first lead is electrically connected to the circuit element electrode,
wherein the circuit element at least partially overlaps the first lead when viewed in an extending direction of the circuit element,
wherein the fixed part comprises a base, and the base comprises a bottom plate,
wherein the circuit element is located between the reinforcement element and the bottom plate.

14. The optical element driving mechanism as claimed in claim 13, wherein a circuit element boundary of the circuit element is located between a reinforcement element boundary of the reinforcement element and a bottom plate boundary of the bottom plate when view along the first direction,
wherein the reinforcement element boundary, the circuit element boundary and the bottom plate boundary do not overlap each other when view along the first direction,
wherein the driving assembly further comprises a second coil, and the base further comprises an overflow groove and a circuit member,
wherein the adhering element is in direct contact with the reinforcement element boundary, the circuit element boundary and the bottom plate boundary,
wherein the bottom plate boundary is located on the overflow groove,
wherein the overflow groove limits a disposed range of the adhering element,
wherein the second coil is electrically connected to the circuit assembly via the circuit member,
wherein the first coil is directly electrically connected to the circuit assembly.

15. The optical element driving mechanism as claimed in claim 14, wherein the second coil comprises a second lead,
wherein the circuit element further comprises a second circuit element receiving portion, corresponding to the second lead,
wherein the adhering element is provided between the circuit element and the base.

16. The optical element driving mechanism as claimed in claim 15, wherein the circuit element revealed portion is covered by the adhering element when viewed along the first direction,
wherein the circuit element at least partially overlaps the adhering element when viewed in a direction that is perpendicular to the first direction.

17. The optical element driving mechanism as claimed in claim 1, further comprising a circuit assembly, electrically connected to the driving assembly, and the circuit assembly comprises a circuit element,
wherein the fixed part comprises a base, the base comprises a second base sidewall and a base electrical connection portion that is embedded in the second base sidewall.

18. The optical element driving mechanism as claimed in claim 17, wherein the driving assembly comprises:
a first coil, directly electrically connected to the circuit element; and
a second coil, electrically connected to the circuit element via the base electrical connection portion.

19. The optical element driving mechanism as claimed in claim 1, further comprising an elastic assembly and a damping element,
wherein the damping element is disposed between at least one of the fixed part and the movable part and the elastic assembly,
wherein the fixed part comprises:
a fixed part contacting element, comprising a spring;
a void structure, corresponding to the fixed part contacting element;
a base, comprising a bottom plate and a base connecting portion, the base connecting portion being embedded into the bottom plate; and
an outer frame, comprising an outer frame connecting portion, the outer frame connecting portion being perpendicular to the base connecting portion and being fixedly connected to the base connecting portion by welding.

20. The optical element driving mechanism as claimed in claim 19, wherein the movable part comprises a movable part contacting element,
wherein the supporting assembly comprises:
a lubricating element, in direct contact with the movable part or the fixed part, and in direct contact with the movable part contacting element or the fixed part contacting element;
wherein the fulcrum element has a spherical structure,
wherein the optical element adjusts a traveling direction of a light from a first direction to a second direction, and the first direction is perpendicular to the second direction.

* * * * *